(12) United States Patent
Zhang et al.

(10) Patent No.: US 12,196,370 B2
(45) Date of Patent: Jan. 14, 2025

(54) GAS FUEL SUPPLY SYSTEM

(71) Applicant: YANTAI JEREH PETROLEUM EQUIPMENT & TECHNOLOGIES CO., LTD., Shandong (CN)

(72) Inventors: Haibo Zhang, Shandong (CN); Lining Xu, Shandong (CN); Wangwang Zhuo, Shandong (CN); Ting Zhang, Shandong (CN); Qiong Wu, Shandong (CN); Wanchun Zha, Shandong (CN); Jianglei Zou, Shandong (CN); Fulun Bi, Shandong (CN); Cong Zhang, Shandong (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 434 days.

(21) Appl. No.: 17/570,993

(22) Filed: Jan. 7, 2022

(65) Prior Publication Data

US 2023/0117362 A1    Apr. 20, 2023

(30) Foreign Application Priority Data

Oct. 18, 2021    (CN) .......................... 202111207960.1

(51) Int. Cl.
*B01D 46/00*    (2022.01)
*B01D 46/42*    (2006.01)
(Continued)

(52) U.S. Cl.
CPC .......... *F17C 13/04* (2013.01); *B01D 46/4263* (2013.01); *B01D 46/4272* (2013.01);
(Continued)

(58) Field of Classification Search
CPC .............................. F17C 13/04; F17C 13/025; F17C 2205/0326; F17C 2205/0338;
(Continued)

(56) References Cited

U.S. PATENT DOCUMENTS

| 4,300,347 | A  | * | 11/1981 | Smith | F02C 9/263 |
|  |  |  |  |  | 91/426 |
| 2013/0283811 | A1 | * | 10/2013 | Potel | F02C 7/224 |
|  |  |  |  |  | 60/734 |
| 2016/0305338 | A1 | * | 10/2016 | Chapski | F02C 7/232 |

FOREIGN PATENT DOCUMENTS

| CN | 202325859 U | 7/2012 |
| CN | 205227630 U | 5/2016 |

(Continued)

*Primary Examiner* — T. Bennett McKenzie
(74) *Attorney, Agent, or Firm* — XSENSUS LLP

(57) ABSTRACT

Disclosed is a gas fuel supply system including a main fuel inlet, a pressure regulating valve, a pneumatically controlled shutoff bleeder valve and a main fuel outlet that are connected through pipes. The pneumatically controlled shutoff bleeder valve includes a pneumatic control valve and a shutoff bleeder valve. The shutoff bleeder valve is configured to open or close a gas fuel delivery passage from the main fuel inlet to the main fuel outlet, or configured to discharge the gas fuel in the pipe. The pneumatic control valve is configured to control the shutoff bleeder valve to be in a desired state. The gas fuel supply system does not need connection to an additional gas source, and the gas supply stability is improved.

20 Claims, 2 Drawing Sheets

(51) Int. Cl.
*B01D 46/62* (2022.01)
*B01D 50/20* (2022.01)
*F17C 13/02* (2006.01)
*F17C 13/04* (2006.01)
*B01D 45/16* (2006.01)

(52) U.S. Cl.
CPC .............. *B01D 46/62* (2022.01); *B01D 50/20* (2022.01); *F17C 13/025* (2013.01); *B01D 45/16* (2013.01); *F17C 2205/0326* (2013.01); *F17C 2205/0338* (2013.01); *F17C 2205/0352* (2013.01); *F17C 2221/033* (2013.01); *F17C 2227/0302* (2013.01); *F17C 2250/043* (2013.01); *F17C 2250/0636* (2013.01)

(58) Field of Classification Search
CPC ...... F17C 2205/0352; F17C 2227/0302; F17C 2250/043; F17C 2250/0636; B01D 46/62; B01D 46/4263; B01D 46/4272; B01D 50/20; B01D 45/16
USPC .......................................................... 55/315
See application file for complete search history.

(56) References Cited

FOREIGN PATENT DOCUMENTS

| | | |
|---|---|---|
| CN | 206861248 U | 1/2018 |
| CN | 207647623 U | 7/2018 |
| CN | 110887059 A | 3/2020 |
| CN | 211316244 U | 8/2020 |
| CN | 112065584 A | 12/2020 |
| CN | 212130621 U | 12/2020 |
| CN | 112727604 A | 4/2021 |
| EP | 2343444 A2 | 7/2011 |

\* cited by examiner

GAS FUEL SUPPLY SYSTEM

The application claims priority to the Chinese patent application No. 202111207960.1, filed Oct. 18, 2021, the entire disclosure of which is incorporated herein by reference as part of the present application.

TECHNICAL FIELD

Embodiments of the present disclosure relate to a gas fuel supply system.

BACKGROUND

Gas turbines have many advantages such as fast start-up and low emissions of gas pollutants. In recent years, significant development has been achieved in many fields such as gas turbine power generation and turbine fracturing. A gas fuel supply system for a gas turbine is an important component for maintaining the stable operation of the gas turbine. The gas fuel supply system is required to ensure the rapid supply and stable shutoff of a gas fuel for the gas turbine and also required to ensure that the gas conditions such as temperature and cleanliness of the gas fuel meet the requirements of a combustion chamber of the gas turbine. In the fuel supply process, a gas metering system is also needed to adjust the flow rate of the gas fuel entering the combustion chamber, thereby ensuring the stable operation of the gas turbine.

With regard to gas fuel supply systems for existing gas turbines, for example, a gas fuel supply system for a mobile gas turbine power generator, an additional gas source independent of the gas fuel is usually needed to control the gas fuel supply system. However, the additional gas source may be unstable in pressure, which therefore may lead to a decrease in the stability of the gas fuel supply system.

SUMMARY

An Embodiment of the disclosure provides a gas fuel supply system including a main fuel inlet, a pressure regulating valve, a pneumatically controlled shutoff bleeder valve and a main fuel outlet that are connected through pipes. The pneumatically controlled shutoff bleeder valve includes a pneumatic control valve and a shutoff bleeder valve. The shutoff bleeder valve is configured to open or close a gas fuel delivery passage from the main fuel inlet to the main fuel outlet, or configured to discharge the gas fuel in the pipe. The pneumatic control valve is configured to control the shutoff bleeder valve to be in a desired state. The gas fuel from the main fuel inlet enters the pressure regulating valve and the shutoff bleeder valve, respectively. The gas fuel out of the pressure regulating valve enters a control port of the pneumatic control valve, thereby causing the pneumatic control valve to control the shutoff bleeder valve. During the gas fuel supply by the gas fuel supply system provided in the embodiment of the present disclosure, the pressure of the gas fuel itself can be used to control the system without connection to an additional gas source, and the gas supply stability is improved.

An embodiment of the disclosure provides a gas fuel supply system, comprising a main fuel inlet, a first pressure regulating valve, a first pneumatically controlled shutoff bleeder valve and a main fuel outlet that are connected through pipes, wherein the first pressure regulating valve comprises a first pressure regulating inlet and a first pressure regulating outlet; the first pressure regulating valve is configured to regulate a pressure of the first pressure regulating outlet; the first pneumatically controlled shutoff bleeder valve comprises a first pneumatic control valve and a first shutoff bleeder valve; the first pneumatic control valve comprises a first pneumatic control inlet and a first pneumatic control outlet; the first shutoff bleeder valve comprises a first fuel inlet, a first fuel outlet, and a first bleeding outlet; the first pressure regulating inlet and the first fuel inlet are each connected to the main fuel inlet; the first pressure regulating outlet is connected to the first pneumatic control inlet, and the first fuel outlet is connected to the main fuel outlet; the first shutoff bleeder valve comprises a first passage and a second passage; in the first passage, the first bleeding outlet is closed, and the first fuel inlet is communicated with the first fuel outlet; in the second passage, the first fuel inlet is closed, and the first fuel outlet is communicated with the first bleeding outlet; and the first pneumatic control valve is configured to open one of the first passage and the second passage of the first shutoff bleeder valve and close the other one of the first passage and the second passage of the first shutoff bleeder valve under the action of pressure.

In some embodiments, the gas fuel supply system further comprises a bleeding port, wherein the first bleeding outlet is connected to the bleeding port.

In some embodiments, the gas fuel supply system further comprises a second pressure regulating valve and a second pneumatically controlled shutoff bleeder valve, wherein the second pressure regulating valve comprises a second pressure regulating inlet and a second pressure regulating outlet; the second pressure regulating valve is configured to regulate a pressure of the second pressure regulating outlet; the second pneumatically controlled shutoff bleeder valve comprises a second pneumatic control valve and a second shutoff bleeder valve; the second pneumatic control valve comprises a second pneumatic control inlet and a second pneumatic control outlet; the second shutoff bleeder valve comprises a second fuel inlet, a second fuel outlet, and a second bleeding outlet; the second pressure regulating inlet and the second fuel inlet are each connected to the first fuel outlet; the second pressure regulating outlet is connected to the second pneumatic control inlet, and the second fuel outlet is connected to the main fuel outlet; the second shutoff bleeder valve comprises a third passage and a fourth passage; in the third passage, the second bleeding outlet is closed, and the second fuel inlet is communicated with the second fuel outlet; in the fourth passage, the second fuel inlet is closed, and the second fuel outlet is communicated with the second bleeding outlet; and the second pneumatic control valve is configured to open one of the third passage and the fourth passage of the second shutoff bleeder valve and close the other one of the third passage and the fourth passage of the second shutoff bleeder valve under the action of pressure.

In some embodiments, the second bleeding outlet is connected to the bleeding port.

In some embodiments, the main fuel inlet, the first pressure regulating outlet, the first pneumatic control outlet, the second pressure regulating outlet and the second pneumatic control outlet are connected to the bleeding port, respectively.

In some embodiments, the gas fuel supply system further comprises a gas-water separator disposed between the main fuel inlet and the first pneumatically controlled shutoff bleeder valve and configured to remove water in a gas fuel.

In some embodiments, the gas fuel supply system further comprises a heater disposed between the gas-water separator and the first pneumatically controlled shutoff bleeder valve and configured to heat the gas fuel.

In some embodiments, the gas fuel supply system further comprises a first filter disposed between the heater and the first pneumatically controlled shutoff bleeder valve and configured to remove solid particles in the gas fuel.

In some embodiments, the gas fuel supply system further comprises a first differential pressure five-valve group connected to two ends of the first filter and configured to monitor a differential pressure between the two ends of the first filter.

In some embodiments, the gas fuel supply system further comprises a second filter disposed between the first pneumatically controlled shutoff bleeder valve and the main fuel outlet and configured to remove solid particles in the gas fuel.

In some embodiments, the gas fuel supply system further comprises a second differential pressure five-valve group connected to two ends of the second filter and configured to monitor a differential pressure between the two ends of the second filter.

In some embodiments, the gas fuel supply system further comprises a flame arrester disposed between the bleeding port, and the main fuel inlet, the first pressure regulating outlet, the first pneumatic control outlet, the first bleeding outlet, the second pressure regulating outlet, the second pneumatic control outlet, and the second bleeding outlet.

In some embodiments, the gas fuel supply system further comprises a first safety valve disposed between the heater and the bleeding port and configured to ensure that an outlet pressure of the heater does not exceed a first set value.

In some embodiments, the gas fuel supply system further comprises a second safety valve disposed between the first pressure regulating outlet of the first pressure regulating valve and the bleeding port and configured to ensure that the pressure of the first pressure regulating outlet does not exceed a second set value.

In some embodiments, the gas fuel supply system further comprises a third safety valve disposed between the second pressure regulating outlet of the second pressure regulating valve and the bleeding port and configured to ensure that the pressure of the second pressure regulating outlet does not exceed a third set value.

In some embodiments, the gas fuel supply system further comprises a third pressure regulating valve disposed between the main fuel inlet and the gas-water separator and configured to regulate a pressure of the main fuel inlet.

In some embodiments, the gas fuel supply system further comprises an inlet measurement and control instrument area disposed between the third pressure regulating outlet and the gas-water separator and configured to monitor an outlet pressure of the third pressure regulating outlet.

In some embodiments, the gas fuel supply system further comprises a gas metering valve disposed between the second filter and the main fuel outlet and configured to control a flow rate of the main fuel outlet.

In some embodiments, the gas fuel supply system further comprises an outlet measurement and control instrument area disposed between the second filter and the gas metering valve and configured to monitor an outlet pressure of the second filter.

In some embodiments, the gas fuel supply system further comprises a switching valve disposed between the main fuel inlet and the third pressure regulating valve and configured to open or close the gas fuel supply system.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Figure 1:
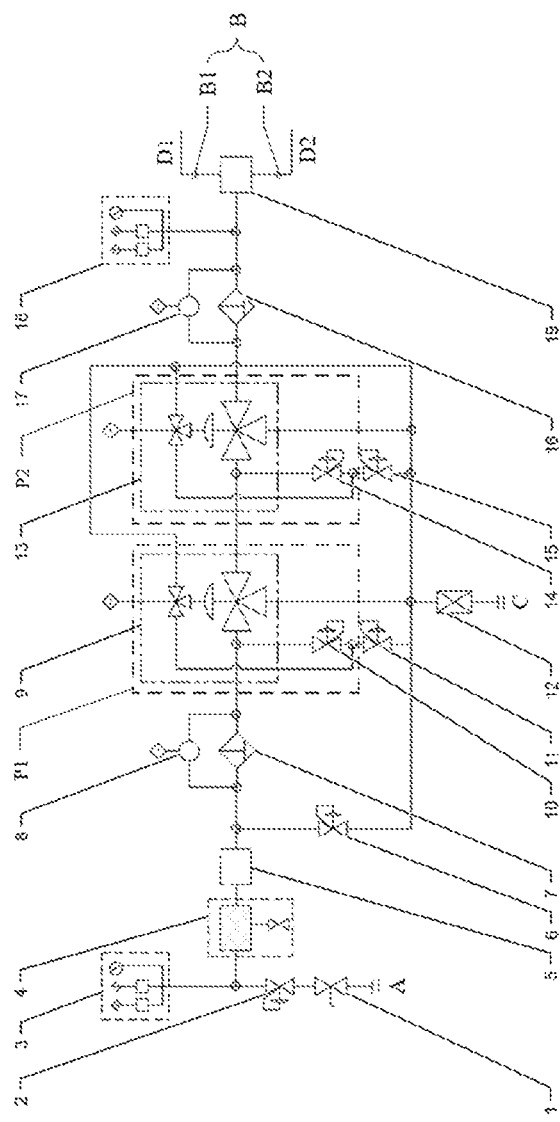
FIG. 1 is a structure diagram of a gas fuel supply system according to an embodiment of the present disclosure.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise specified, the technical terms or scientific terms used in the disclosure shall have normal meanings understood by those skilled in the art. The words "first", "second" and the like used in the disclosure do not indicate the sequence, the number or the importance but are only used for distinguishing different components. The word "comprise", "include" or the like only indicates that an element or a component before the word contains elements or components listed after the word and equivalents thereof, not excluding other elements or components. The words "connection", "connected" and the like are not limited to physical or mechanical connection but may include electrical connection, either directly or indirectly.

An embodiment of the present disclosure provides a gas fuel supply system which can be used to supply a gas fuel to equipment such as a gas turbine. The gas fuel supply system includes a main fuel inlet, a pressure regulating valve, a pneumatically controlled shutoff bleeder valve and a main fuel outlet that are connected through pipes. The pneumatically controlled shutoff bleeder valve includes a pneumatic control valve and a shutoff bleeder valve. The shutoff bleeder valve is configured to open or close a gas fuel delivery passage from the main fuel inlet to the main fuel outlet, or configured to discharge the gas fuel in the pipe. The pneumatic control valve is configured to control the shutoff bleeder valve to be in a desired state. The gas fuel from the main fuel inlet enters the pressure regulating valve and the shutoff bleeder valve, respectively. The gas fuel out of the pressure regulating valve enters a control port of the pneumatic control valve, thereby causing the pneumatic control valve to control the shutoff bleeder valve.

In the gas fuel supply system provided in the embodiment of the present disclosure, the gas fuel out of the pressure regulating valve is used to control the pneumatic control valve and thereby control the shutoff bleeder valve. Moreover, the control gas source from the pressure regulating valve comes from the main fuel inlet. Accordingly, when the gas fuel supply system provided in the embodiment of the present disclosure supplies the gas fuel, the pressure of the gas fuel itself can be used to control the system without connection to an additional gas source, and the influence of potential adverse factors such as unstable pressure of the additional gas source can be avoided. Therefore, the gas supply stability is improved.

A gas fuel supply system for a gas turbine provided in an embodiment of the present disclosure will be described in detail below with reference to the accompanying drawing.

An embodiment of the present disclosure provides a gas fuel supply system which can be used to supply a gas fuel to equipment such as a gas turbine, wherein the gas fuel may be, for example, natural gas. FIG. 1 is a schematic structure diagram of the gas fuel supply system. As illustrated in FIG. 1, the gas fuel supply system includes a main fuel inlet A, a first pressure regulating valve 10, a first pneumatically controlled shutoff bleeder valve 9 and a main fuel outlet B that are connected through pipes.

Figure 2:
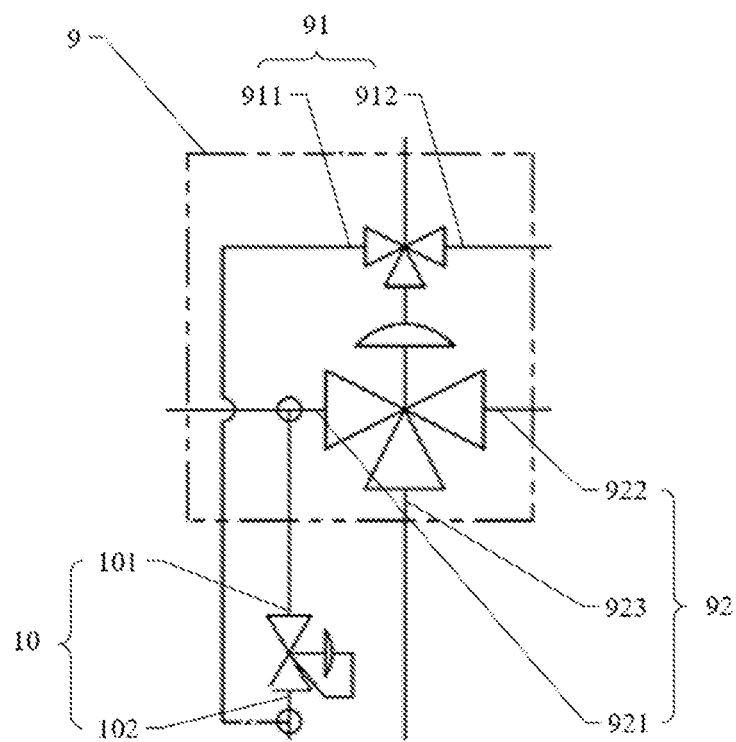
FIG. 2 is a partial enlarged structure diagram of area P1 in FIG. 1.

FIG. 2 is a partial enlarged structure diagram of area P1 in FIG. 1, which illustrates the first pneumatically controlled shutoff bleeder valve 9 and the first pressure regulating valve 10.

For example, as illustrated in FIG. 2, the first pressure regulating valve 10 includes a first pressure regulating inlet 101 and a first pressure regulating outlet 102. The first pressure regulating valve 10 is configured to regulate the pressure of the first pressure regulating outlet 102. For example, the first pressure regulating valve 10 may be a pressure reducing valve, an overflow valve, or the like. The first pneumatically controlled shutoff bleeder valve 9 includes a first pneumatic control valve 91 and a first shutoff bleeder valve 92. The first pneumatic control valve 91 includes a first pneumatic control inlet 911 and a first pneumatic control outlet 912. The first shutoff bleeder valve 92 includes a first fuel inlet 921, a first fuel outlet 922, and a first bleeding outlet 923.

For example, as illustrated in FIG. 1 and FIG. 2, the first pressure regulating inlet 101 and the first fuel inlet 921 are each connected to the main fuel inlet A. The first pressure regulating outlet 102 is connected to the first pneumatic control inlet 911, and the first fuel outlet 922 is connected to the main fuel outlet B. It needs to be noted that the connection of two ports or components here is not limited to a direct connection and may also be an indirect connection through other component connected therebetween. For example, a plurality of other functional components may further be connected between the first pressure regulating inlet 101 and the main fuel inlet A. A plurality of other functional components may also be connected between the first fuel outlet 922 and the main fuel outlet B, which will be further described below.

For example, as illustrated in FIG. 1 and FIG. 2, the first shutoff bleeder valve 92 includes a first passage and a second passage. In the first passage, the first bleeding outlet 923 is closed, and the first fuel inlet 921 is communicated with the first fuel outlet 922. In the second passage, the first fuel inlet 921 is closed, and the first fuel outlet 922 is communicated with the first bleeding outlet 923.

The first pneumatic control valve 91 is configured to open one of the first passage and the second passage of the first shutoff bleeder valve 92 and close the other one of the first passage and the second passage of the first shutoff bleeder valve 92 under the action of pressure.

For example, when the gas fuel supply system begins to supply the gas fuel, the gas fuel from the main fuel inlet A is distributed into two streams, and the first stream is joined to the first pressure regulating inlet 101 of the first pressure regulating valve 10, while the second stream is joined to the first fuel inlet 921 of the first pneumatically controlled shutoff bleeder valve 9. The gas fuel of the first stream enters the first pressure regulating inlet 101 of the first pressure regulating valve 10, and then enters the first pneumatic control inlet 911 of the first pneumatic control valve 91 from the first pressure regulating outlet 102 after being regulated in pressure in the first pressure regulating valve 10, thereby causing the first pneumatic control valve 91 to open the first passage of the first shutoff bleeder valve 92. After the first passage is opened, the gas fuel of the second stream flows in from the first fuel inlet 921 and out from the first fuel outlet 922, and then enters the main fuel outlet B.

For example, the first pneumatically controlled shutoff bleeder valve 9 further includes a signal receiving unit. The signal receiving unit is configured to receive and execute instructions transmitted from the outside. For example, before the signal receiving unit receives a startup instruction of the gas turbine, the first fuel inlet of the first shutoff bleeder valve is in a closed state, and the gas fuel cannot pass through the first shutoff bleeder valve. The first pneumatic control valve can control the first shutoff bleeder valve only after the signal receiving unit receives the startup instruction of the gas turbine.

In the gas fuel supply system provided in the embodiment of the present disclosure, the gas fuel entering from the main fuel inlet is distributed into at least two streams, of which one stream is a main stream for delivery to the main fuel outlet and supply to a combustion chamber of the gas turbine to burn. Another stream is an auxiliary stream which is regulated in pressure by the first pressure regulating valve and then delivered to the first pneumatically controlled shutoff bleeder valve as a control gas for controlling the first pneumatically controlled shutoff bleeder valve. When the gas fuel supply system provided in the embodiment of the present disclosure supplies the gas fuel, the pressure of the gas fuel itself can be used to control the system without connection to an additional gas source, and the influence of potential adverse factors such as unstable pressure of the additional gas source can be avoided. Therefore, the gas supply stability is improved.

For example, as illustrated in FIG. 1, the gas fuel supply system further includes a bleeding port C. The first bleeding outlet 923 of the first pneumatically controlled shutoff bleeder valve 9 is connected to the bleeding port C. The first pneumatic control outlet 912 of the first pneumatically controlled shutoff bleeder valve 9 is also connected to the bleeding port C.

For example, under the working conditions such as shutdown of the gas turbine, the first pneumatic control outlet 912 of the first pneumatic control valve 91 is opened, and the internal gas fuel is discharged to the outside through the bleeding port C. The first pneumatic control valve 91 loses the control pressure for the first shutoff bleeder valve 92. The first fuel inlet and the first fuel outlet of the first shutoff bleeder valve 92 are disconnected (i.e., the first passage is closed), and the first fuel outlet is communicated with the first bleeding outlet (i.e., the second passage is opened). Thus, the residual gas fuel in the first shutoff bleeder valve 92 and the subsequent pipe can be discharged to the outside through the bleeding port C. The bleeder valve is provided so that the safety of the gas fuel supply system can be improved.

Figure 3:
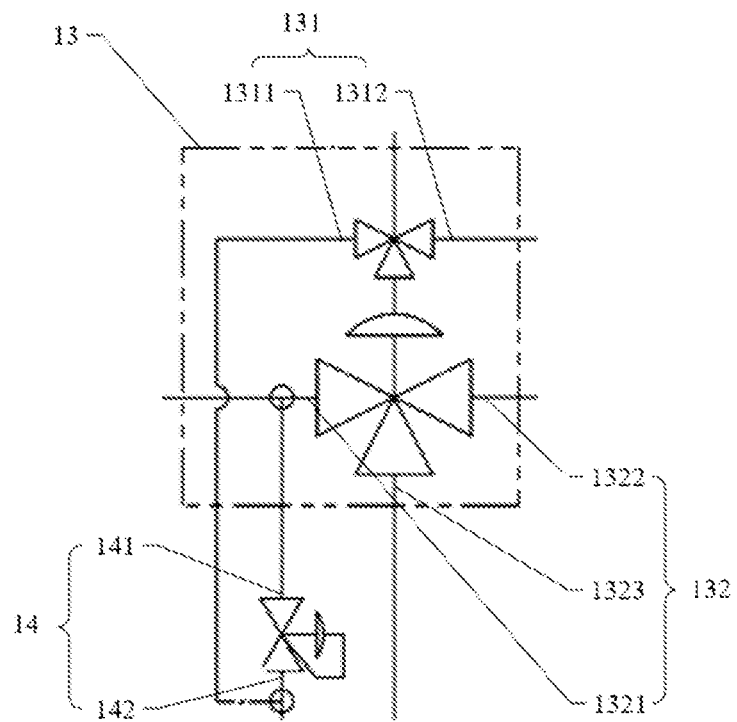
FIG. 3 is a partial enlarged structure diagram of area P2 in FIG. 1.

For example, the gas fuel supply system provided in the embodiment of the present disclosure further includes a second pressure regulating valve and a second pneumatically controlled shutoff bleeder valve. FIG. 3 is a partial enlarged structure diagram of area P2 in FIG. 1, which illustrates the second pneumatically controlled shutoff bleeder valve 13 and the second pressure regulating valve 14.

For example, as illustrated in FIG. 3, the second pressure regulating valve 14 includes a second pressure regulating inlet 141 and a second pressure regulating outlet 142. The second pressure regulating valve 14 is configured to regulate the pressure of the second pressure regulating outlet 142. For example, the second pressure regulating valve 14 may be a pressure reducing valve, an overflow valve, or the like. The second pneumatically controlled shutoff bleeder valve 13 includes a second pneumatic control valve 131 and a second shutoff bleeder valve 132. The second pneumatic control valve 131 includes a second pneumatic control inlet 1311 and a second pneumatic control outlet 1312. The second shutoff bleeder valve 132 includes a second fuel inlet 1321, a second fuel outlet 1322, and a second bleeding outlet 1323.

For example, as illustrated in FIG. 1 and FIG. 3, the second pressure regulating inlet 141 and the second fuel inlet 1321 are each connected to the first fuel outlet 922. The second pressure regulating outlet 142 is connected to the second pneumatic control inlet 1311, and the second fuel outlet 1322 is connected to the main fuel outlet B.

For example, as illustrated in FIG. 1 and FIG. 2, the second shutoff bleeder valve 132 includes a third passage and a fourth passage. In the third passage, the second bleeding outlet 1323 is closed, and the second fuel inlet 1321 is communicated with the second fuel outlet 1322. In the fourth passage, the second fuel inlet 1321 is closed, and the second fuel outlet 1322 is communicated with the second bleeding outlet 1323.

The second pneumatic control valve 131 is configured to open one of the third passage and the fourth passage of the second shutoff bleeder valve 132 and close the other one of the third passage and the fourth passage of the second shutoff bleeder valve 132 under the action of pressure.

As illustrated in FIG. 1, the second pneumatically controlled shutoff bleeder valve is connected in series behind the first pneumatically controlled shutoff bleeder valve, and the second pressure regulating valve is configured to control the opening, closing or bleeding of the second pressure regulating valve. The second pneumatically controlled shutoff bleeder valve and the first pneumatically controlled shutoff bleeder valve form a two-stage shutoff bleeder system which can avoid the gas fuel from leakage to a rear end (the end where the main fuel outlet B is located) in a shutoff state more effectively, thereby further improving the stability of the gas fuel supply system.

For example, when the gas fuel supply system begins to supply the gas fuel, the gas fuel from the first fuel outlet 922 is distributed into two streams, and the first stream is joined to the second pressure regulating inlet 141 of the second pressure regulating valve 14, while the second stream is joined to the second fuel inlet 1321 of the second pneumatically controlled shutoff bleeder valve 13. The gas fuel of the first stream enters the second pressure regulating inlet 141 of the second pressure regulating valve 14, and then enters the second pneumatic control inlet 1311 of the second pneumatic control valve 131 from the second pressure regulating outlet 142 after being regulated in pressure in the second pressure regulating valve 14, thereby causing the second pneumatic control valve 131 to open the third passage of the second shutoff bleeder valve 132. After the third passage is opened, the gas fuel of the second stream flows in from the second fuel inlet 1321 and out from the second fuel outlet 1322, and then enters the main fuel outlet B.

For example, the second pneumatically controlled shutoff bleeder valve 13 further includes a signal receiving unit. The signal receiving unit is configured to receive and execute instructions transmitted from the outside. For example, before the signal receiving unit receives a startup instruction of the gas turbine, the second fuel inlet of the second shutoff bleeder valve is in a closed state, and the gas fuel cannot pass through second shutoff bleeder valve. The second pneumatic control valve can control the second shutoff bleeder valve only after the signal receiving unit receives the startup instruction of the gas turbine.

In the gas fuel supply system provided in the embodiment of the present disclosure, the gas fuel from the first fuel outlet is distributed into at least two streams, of which one stream is a main stream for delivery to the main fuel outlet and supply to a combustion chamber of the gas turbine to burn after passing through the second shutoff bleeder valve. Another stream is an auxiliary stream which is regulated in pressure by the second pressure regulating valve and then delivered to the second pneumatically controlled shutoff bleeder valve as a control gas for controlling the second pneumatically controlled shutoff bleeder valve. With the two-stage shutoff bleeder system, the gas fuel supply system provided in the embodiment of the present disclosure can use the pressure of the gas fuel itself to control the system without connection to an additional gas source, and the influence of potential adverse factors such as unstable pressure of the additional gas source can be avoided. Moreover, the leakage of the gas fuel can be avoided more effectively, and the stability of the gas supply system can be further improved.

For example, as illustrated in FIG. 1, the second bleeding outlet 1323 of the second pneumatically controlled shutoff bleeder valve 13 is connected to the bleeding port C. The second pneumatic control outlet 1312 of the second pneumatically controlled shutoff bleeder valve 13 is also connected to the bleeding port C.

For example, under the working conditions such as shutdown of the gas turbine, the second pneumatic control outlet 1312 of the second pneumatic control valve 131 is opened, and the internal gas fuel is discharged to the outside through the bleeding port C. The second pneumatic control valve 131 loses the control pressure for the second shutoff bleeder valve 132. The second fuel inlet and the second fuel outlet of the second shutoff bleeder valve 132 are disconnected (i.e., the third passage is closed), and the second fuel outlet is communicated with the second bleeding outlet (i.e., the fourth passage is opened). Thus, the residual gas fuel in the second shutoff bleeder valve 132 and the subsequent pipe can be discharged to the outside through the bleeding port C.

For example, as illustrated in FIG. 1, in addition to the first pneumatic control outlet 912, the first bleeding outlet 923, the second pneumatic control outlet 1312, and the second bleeding outlet 1323, the main fuel inlet A, the first pressure regulating outlet 102, and the second pressure regulating outlet 142 may also be connected to the bleeding port C, respectively. Thus, the bleeding function of pipes and components at a plurality of pipes in the gas fuel supply system can be realized, and the safety of the gas fuel supply system can be improved.

For example, as illustrated in FIG. 1, the gas fuel supply system further includes a gas-water separator 4. The gas-water separator 4 is disposed between the main fuel inlet A and the first pneumatically controlled shutoff bleeder valve 9, and configured to remove water in the gas fuel and prevent the formation of a condensed fluid. In case that the condensed fluid enters the gas turbine, it will damage internal elements of the gas turbine. For example, the gas-water separator 4 may be a centrifugal gas-water separator.

For example, as illustrated in FIG. 1, the gas fuel supply system further includes a heater 5. The heater 5 is disposed between the gas-water separator 4 and the first pneumatically controlled shutoff bleeder valve 9 and configured to heat the gas fuel. Generally, increasing the inlet temperature of the fuel is beneficial to improve the combustion efficiency of the combustion chamber of the gas turbine. The heater 5 may be provided to heat the gas fuel to a set value to meet the fuel inlet temperature requirement of the combustion chamber of the gas turbine. As illustrated in FIG. 1, after being separated from water by the centrifugal gas-water separator 4, the gas fuel enters the heater 5. At this point, whether the temperature of the gas fuel reaches a set value is determined. If the temperature is lower than the set value, the heater 5 is started to heat the gas fuel. If the temperature of the gas fuel is higher than the set value, the heater 5 is turned off.

For example, as illustrated in FIG. 1, the gas fuel supply system further includes a first filter 7. The first filter 7 is disposed between the heater 5 and the first pneumatically controlled shutoff bleeder valve 9 and configured to remove solid particles in the gas fuel. The first filter 7 is provide to help to purify the gas fuel and prevent impurities such as solid particles from blocking a fuel nozzle of the gas turbine, so that the gas fuel can be uniformly mixed with air. Thus, the combustion efficiency can be improved and a burner can be protected. For example, the first filter 7 may be a single, duplex or multiple filter.

For example, as illustrated in FIG. 1, the gas fuel supply system further includes a first differential pressure five-valve group 8 which is connected to two ends of the first filter 7 and configured to monitor a differential pressure between the two ends of the first filter 7. The first differential pressure five-valve group 8 may be configured to determine whether the operating state of the first filter is normal by monitoring the differential pressure between the two ends of the first filter 7. When the differential pressure exceeds an alarm value, an alarm may be given to remind an operator of replacing a filter element in time.

For example, as illustrated in FIG. 1, the gas fuel supply system further includes a second filter 16 which is disposed between the first pneumatically controlled shutoff bleeder valve 9 and the main fuel outlet B and configured to remove solid particles in the gas fuel. The second filter 16 is provided to help to purify the gas fuel and prevent impurities such as solid particles from blocking a fuel nozzle of the gas turbine, so that the gas fuel can be uniformly mixed with air. Thus, the combustion efficiency can be improved and a burner can be protected. For example, the second filter 16 may be a single, duplex or multiple filter.

For example, as illustrated in FIG. 1, the second filter 16 may be disposed between the second pneumatically controlled shutoff bleeder valve 13 and the main fuel outlet B. The second filter 16 is located at an end, close to the main fuel outlet B, of the gas fuel supply system, and capable of ensuring that the cleanliness of the gas fuel discharged from the main fuel outlet B is at a high level.

For example, as illustrated in FIG. 1, the gas fuel supply system further includes a second differential pressure five-valve group 17 which is connected to two ends of the second filter 16 and configured to monitor a differential pressure between the two ends of the second filter 16. The second differential pressure five-valve group 17 may be configured to determine whether the operating state of the second filter is normal by monitoring the differential pressure between the two ends of the second filter 16. When the differential pressure exceeds an alarm value, an alarm may be given to remind an operator of replacing a filter element in time.

For example, as illustrated in FIG. 1, the gas fuel supply system further includes a flame arrester 12 which is disposed between the bleeding port C, and the main fuel inlet A, the first pressure regulating outlet 102, the first pneumatic control outlet 912, the first bleeding outlet 923, the second pressure regulating outlet 142, the second pneumatic control outlet 1312, and the second bleeding outlet 1323. The flame arrester 12 is configured to block combustion or extinguish a flame. For example, the flame arrester 12 may be a spark arrester. The gas fuel in the gas fuel supply system first passes through the flame arrester and then is discharged to the outside through the bleeding port. Thus, spark or flame of the discharged fuel can be effectively blocked, thereby preventing a fire. As a result, the safety of the fuel supply system can be improved.

For example, as illustrated in FIG. 1, the gas fuel supply system further includes a first safety valve 6 which is disposed between the heater 5 and the bleeding port C and configured to ensure that the outlet pressure of the heater 5 does not exceed a first set value. The first safety valve 6 will be automatically opened when the pressure exceeds the first set value to discharge the gas fuel through the bleeding port C, thereby avoiding danger due to excessively high pressure in the pipe and improving the safety of the gas fuel supply system.

For example, as illustrated in FIG. 1, the gas fuel supply system further includes a second safety valve 11 which is disposed between the first pressure regulating outlet 102 of the first pressure regulating valve 10 and the bleeding port C and configured to ensure that the pressure of the first pressure regulating outlet 102 does not exceed a second set value. The second safety valve 11 will be automatically opened when the pressure exceeds the second set value to discharge the gas fuel through the bleeding port C, thereby avoiding danger due to excessively high pressure in the pipe and improving the safety of the gas fuel supply system.

For example, as illustrated in FIG. 1, the gas fuel supply system further includes a third safety valve 15 which is disposed between the second pressure regulating outlet 142 of the second pressure regulating valve 14 and the bleeding port C and configured to ensure that the pressure of the second pressure regulating outlet 142 does not exceed a third set value. The third safety valve 15 will be automatically opened when the pressure exceeds the third set value to discharge the gas fuel through the bleeding port C, thereby avoiding danger due to excessively high pressure in the pipe and improving the safety of the gas fuel supply system.

For example, as illustrated in FIG. 1, the gas fuel supply system further includes a third pressure regulating valve 2 which is disposed between the main fuel inlet A and the gas-water separator 4 and configured to regulate the pressure of the main fuel inlet A. For example, the third pressure regulating valve 2 may be a pressure reducing valve, an overflow valve, or the like.

For example, as illustrated in FIG. 1, the gas fuel supply system further includes an inlet measurement and control instrument area 3 which is disposed between the third pressure regulating outlet 2 and the gas-water separator 4 and configured to monitor the outlet pressure of the third pressure regulating outlet 2. The inlet measurement and control instrument area 3 is capable of monitoring a supply state of the gas fuel at one end of the main fuel inlet A in real time and giving an alarm in case of an abnormal condition.

For example, as illustrated in FIG. 1, the gas fuel supply system further includes a gas metering valve 19 which is disposed between the second filter 16 and the main fuel outlet B and configured to control the flow rate of the main fuel outlet B. For example, as illustrated in FIG. 1, the main fuel outlet B may include a plurality of outlets, for example, outlets B1 and B2. The plurality of outlets are connected to a plurality of fuel pipes of the combustion chamber of the gas turbine, respectively. For example, the gas metering valve 19 is capable of accurately the controlling flow rate of the gas fuel entering each fuel pipe of the combustion chamber of the gas turbine, thus realizing accurate control on the operating state of the gas turbine.

For example, as illustrated in FIG. 1, the gas fuel supply system further includes an outlet measurement and control instrument area 18 which is disposed between the second filter 16 and the gas metering valve 19 and configured to monitor the outlet pressure of the second filter 16. The outlet measurement and control instrument area 18 is capable of monitoring a supply state of the gas fuel at one end of the main fuel outlet B in real time and giving an alarm in case of an abnormal condition.

For example, as illustrated in FIG. 1, the gas fuel supply system further includes a switching valve 1 which is disposed between the main fuel inlet A and the third pressure regulating valve 2 and configured to open or close the gas fuel supply system. For example, the switching valve 1 may be a ball valve, a shutoff valve, a butterfly valve, or the like.

The following statements should be noted:

(1) The accompanying drawings related to the embodiment(s) of the present disclosure involve only the structure(s) in connection with the embodiment(s) of the present disclosure, and other structure(s) can be referred to common design(s).

(2) In case of no conflict, features in one embodiment or in different embodiments of the present disclosure can be combined.

The foregoing is only the preferred embodiments of the present invention and not intended to limit the scope of protection of the present invention. Any change or replacement that may be easily thought of by those skilled in the art within the technical scope disclosed by the present invention shall fall within the scope of protection of the present invention. Therefore, the scope of protection of the present invention shall be defined by the appended claims.

The invention is claimed is:

1. A gas fuel supply system, comprising a main fuel inlet, a first pressure regulating valve, a first pneumatically controlled shutoff bleeder valve and a main fuel outlet that are connected through pipes,
   wherein the first pressure regulating valve comprises a first pressure regulating inlet and a first pressure regulating outlet; the first pressure regulating valve is configured to regulate a pressure of the first pressure regulating outlet; the first pneumatically controlled shutoff bleeder valve comprises a first pneumatic control valve and a first shutoff bleeder valve; the first pneumatic control valve comprises a first pneumatic control inlet and a first pneumatic control outlet; the first shutoff bleeder valve comprises a first fuel inlet, a first fuel outlet, and a first bleeding outlet;
   the first pressure regulating inlet and the first fuel inlet are each connected to the main fuel inlet; the first pressure regulating outlet is connected to the first pneumatic control inlet, and the first fuel outlet is connected to the main fuel outlet;
   the first shutoff bleeder valve comprises a first passage and a second passage; in the first passage, the first bleeding outlet is closed, and the first fuel inlet is communicated with the first fuel outlet; in the second passage, the first fuel inlet is closed, and the first fuel outlet is communicated with the first bleeding outlet; and
   the first pneumatic control valve is configured to open one of the first passage and the second passage of the first shutoff bleeder valve and close the other one of the first passage and the second passage of the first shutoff bleeder valve under the action of pressure.

2. The gas fuel supply system according to claim 1, further comprising a bleeding port, wherein the first bleeding outlet is connected to the bleeding port.

3. The gas fuel supply system according to claim 2, further comprising a second pressure regulating valve and a second pneumatically controlled shutoff bleeder valve,
   wherein the second pressure regulating valve comprises a second pressure regulating inlet and a second pressure regulating outlet; the second pressure regulating valve is configured to regulate a pressure of the second pressure regulating outlet; the second pneumatically controlled shutoff bleeder valve comprises a second pneumatic control valve and a second shutoff bleeder valve; the second pneumatic control valve comprises a second pneumatic control inlet and a second pneumatic control outlet; the second shutoff bleeder valve comprises a second fuel inlet, a second fuel outlet, and a second bleeding outlet;
   the second pressure regulating inlet and the second fuel inlet are each connected to the first fuel outlet; the second pressure regulating outlet is connected to the second pneumatic control inlet, and the second fuel outlet is connected to the main fuel outlet;
   the second shutoff bleeder valve comprises a third passage and a fourth passage; in the third passage, the second bleeding outlet is closed, and the second fuel inlet is communicated with the second fuel outlet; in the fourth passage, the second fuel inlet is closed, and the second fuel outlet is communicated with the second bleeding outlet; and
   the second pneumatic control valve is configured to open one of the third passage and the fourth passage of the second shutoff bleeder valve and close the other one of the third passage and the fourth passage of the second shutoff bleeder valve under the action of pressure.

4. The gas fuel supply system according to claim 3, wherein the second bleeding outlet is connected to the bleeding port.

5. The gas fuel supply system according to claim 4, wherein the main fuel inlet, the first pressure regulating outlet, the first pneumatic control outlet, the second pressure regulating outlet and the second pneumatic control outlet are connected to the bleeding port, respectively.

6. The gas fuel supply system according to claim 2, further comprising a gas-water separator disposed between the main fuel inlet and the first pneumatically controlled shutoff bleeder valve and configured to remove water in a gas fuel.

7. The gas fuel supply system according to claim 6, further comprising a heater disposed between the gas-water separator and the first pneumatically controlled shutoff bleeder valve and configured to heat the gas fuel.

8. The gas fuel supply system according to claim 7, further comprising a first filter disposed between the heater and the first pneumatically controlled shutoff bleeder valve and configured to remove solid particles in the gas fuel.

9. The gas fuel supply system according to claim 8, further comprising a first differential pressure five-valve group connected to two ends of the first filter and configured to monitor a differential pressure between the two ends of the first filter.

10. The gas fuel supply system according to claim 1, further comprising a second filter disposed between the first pneumatically controlled shutoff bleeder valve and the main fuel outlet and configured to remove solid particles in the gas fuel.

11. The gas fuel supply system according to claim 10, further comprising a second differential pressure five-valve group connected to two ends of the second filter and configured to monitor a differential pressure between the two ends of the second filter.

12. The gas fuel supply system according to claim 5, further comprising a flame arrester disposed between the bleeding port, and the main fuel inlet, the first pressure regulating outlet, the first pneumatic control outlet, the first bleeding outlet, the second pressure regulating outlet, the second pneumatic control outlet, and the second bleeding outlet.

13. The gas fuel supply system according to claim 7, further comprising a first safety valve disposed between the heater and the bleeding port and configured to ensure that an outlet pressure of the heater does not exceed a first set value.

14. The gas fuel supply system according to claim 5, further comprising a second safety valve disposed between the first pressure regulating outlet of the first pressure regulating valve and the bleeding port and configured to ensure that the pressure of the first pressure regulating outlet does not exceed a second set value.

15. The gas fuel supply system according to claim 5, further comprising a third safety valve disposed between the second pressure regulating outlet of the second pressure regulating valve and the bleeding port and configured to ensure that the pressure of the second pressure regulating outlet does not exceed a third set value.

16. The gas fuel supply system according to claim 6, further comprising a third pressure regulating valve disposed between the main fuel inlet and the gas-water separator and configured to regulate a pressure of the main fuel inlet.

17. The gas fuel supply system according to claim 16, further comprising an inlet measurement and control instrument area disposed between the third pressure regulating outlet and the gas-water separator and configured to monitor an outlet pressure of the third pressure regulating outlet.

18. The gas fuel supply system according to claim 10, further comprising a gas metering valve disposed between the second filter and the main fuel outlet and configured to control a flow rate of the main fuel outlet.

19. The gas fuel supply system according to claim 18, further comprising an outlet measurement and control instrument area disposed between the second filter and the gas metering valve and configured to monitor an outlet pressure of the second filter.

20. The gas fuel supply system according to claim 16, further comprising a switching valve disposed between the main fuel inlet and the third pressure regulating valve and configured to open or close the gas fuel supply system.

* * * * *